March 25, 1958   H. A. PERKINS, JR., ET AL   2,828,448
PROTECTIVE DEVICES
Filed Nov. 26, 1954

United States Patent Office 2,828,448
Patented Mar. 25, 1958

2,828,448

PROTECTIVE DEVICES

Harley A. Perkins, Jr., Pittsburgh, Pa., and Frederic P. Emery, Buffalo, N. Y., assignors to Westinghouse Electric Corporation, East Pittsburgh, Pa., a corporation of Pennsylvania Application November 26, 1954, Serial No. 471,186

6 Claims. (Cl. 317—19)

This invention relates to protective devices and, more particularly, to protective devices for preventing an overspeed condition of a generator.

When the load on a generator is gradually decreased, the generator normally does not overspeed. However, an overspeed condition does exist on large turbine generator sets when a large percentage of full load is abruptly removed. In particular, the turbine's governing apparatus is unable to compensate for this sudden loss of load, and thus the overspeed condition arises. Normally, the turbine generator is provided with an overspeed tripping device; however, the operation of the tripping device effects a shutdown of the apparatus with a resultant loss in time. Therefore, it is desirable to provide apparatus which prevents an overspeed condition of the generator without effecting a shutdown of the apparatus.

An object of this invention is to provide for the prevention of the overspeed condition of a generator without effecting a shutdown in the generator and without having to effect a manual resetting of the preventive apparatus.

A more specific object of this invention is to provide for initiating a rate determining circuit when the load on the generator decreases to a predetermined value, so that if the load on the generator decreases a further predetermined amount within a preset time the speed of the generator is automatically checked, thus to prevent overspeeding of the generator when a large percentage of its load is abruptly removed.

Another object of this invention is to provide for supplying energy to a control relay from a saturating transformer, to thereby minimize the voltage range over which the relay must operate and thus minimize its size.

A further object of this invention is to provide for effecting a rapid reduction in the output voltage of a saturating transformer when the input voltage to the transformer decreases to a value below that required to substantially saturate the transformer, to thereby lessen the critical setting of a relay responsive to the output voltage of the saturating transformer.

Figure 1:
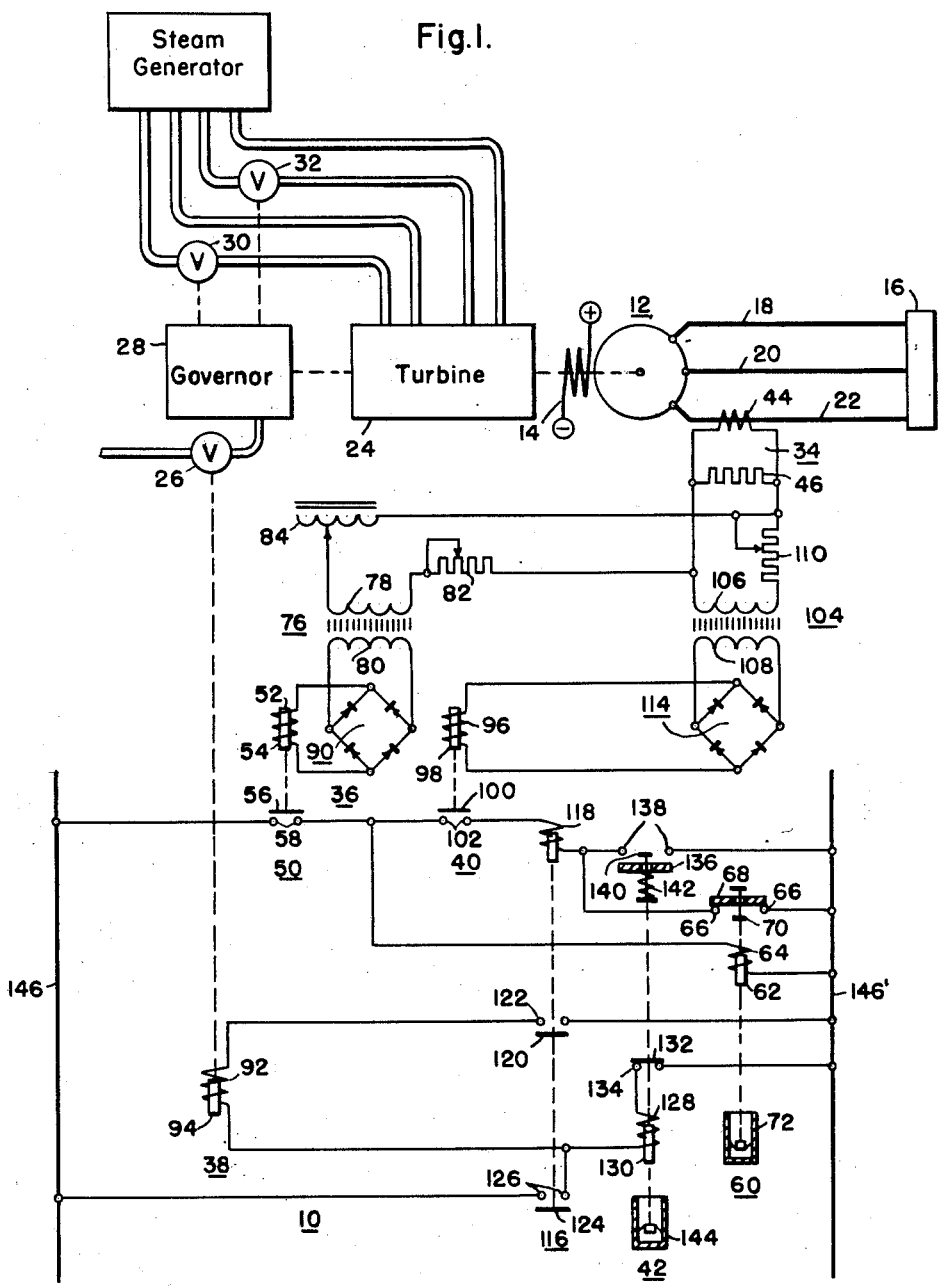
Figure 2:
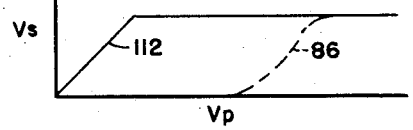

Other objects of this invention will become apparent from the following description when taken in conjunction with the accompanying drawing, in which:

Figure 1 is a schematic diagram of apparatus and circuits embodying the teachings of this invention, and Fig. 2 is a graph illustrating the manner in which the output voltages of the saturating transformers illustrated in Fig. 1 vary with changes in their input voltage.

Referring to Fig. 1, there is illustrated a protective device 10 for preventing an overspeed condition of an alternating-current generator 12, having a field winding 14. In operation, the generator 12 supplies energy to a load 16 through load conductors 18, 20, and 22. As illustrated, the generator 12 is driven by a prime mover or turbine 24 through suitable mechanical linkages. In this instance, the speed of the turbine 24, and thus the speed of the generator 12, is controlled by the positioning of a valve 26, which controls the operation of a governor 28 which, in turn, controls the amount of steam applied to the turbine 24 through valves 30 and 32.

In general, the protective device 10 comprises a sensing circuit 34 for obtaining at its output an alternating voltage which is a measure of the load on the generator 12, a rate determining circuit 36 responsive to the output voltage of the sensing circuit 34 and constructed to initiate a timing operation when the load on the generator 12 decreases to a predetermined value, control means 38 for changing the speed of the turbine 24 and thus the speed of the generator 12, and switch means 40 also responsive to the output voltage of the sensing circuit 34, for effecting an energizing circuit to the control means 38 provided the load on generator 12 decreases further to a lower predetermined value within a preset time, namely, the timing operation of the rate determining circuit 36, to thereby effect a decrease in the speed of the generator 12 and thus prevent its overspeeding, and a time delay relay 42 for insuring that once the energizing circuit to the control means 38 is established it will remain in the completed state for a predetermined time.

In this instance, the sensing circuit 34 comprises a current transformer 44 which is disposed in inductive relationship with the load conductor 22 so as to obtain a measure of the load current in the generator 12, and a resistor 46 which is connected in parallel circuit relationship with the current transformer 44 so as to obtain an alternating voltage across the resistor 46, and thus at the output of the sensing circuit 34, that is a measure of the load current in the generator 12. On the other hand, the rate determining circuit 36 comprises switch means 50, specifically a control relay having an armature 52, an operating coil 54, a movable contact 56, and stationary contacts 58; and a time delay relay 60 having an armature 62, an operating coil 64, stationary contacts 66, a movable contact 68, and an actuating member 70, the function of which will be explained hereinafter. In this instance, the time delay for the relay 60 is effected by a dashpot 72 which is diagrammatically illustrated.

In order to minimize the voltage range over which the control relay 50 must operate and thus minimize its size, the control relay 50 is supplied with energy from a saturating transformer 76 having a primary winding 78 and a secondary winding 80. In operation, the saturating transformer 76 is responsive to the alternating voltage appearing across the resistor 46 and thus is responsive to a measure of the load current in the generator 12.

For the purpose of limiting the current flow through the primary winding 78 of the saturating transformer 76 when the transformer 76 is saturated, to thus prevent damage thereto, an adjustable current-limiting resistor 82 is connected in series circuit relationship with the primary winding 78. By adjusting the resistor 82, the percentage of load current in the generator 12 at which the transformer 76 saturates can be readily varied. For purposes of illustration, it will be assumed that the resistor 82 is adjusted so that the transformer 76 saturates at approximately 50 percent of full load current in the generator 12.

In order to rapidly decrease the output voltage of the saturating transformer 76 when the voltage across the resistor 46 decreases to a value below that required to effect a saturation of the transformer 76, a saturating reactor 84 is connected in series circuit relationship with the primary winding 78 of the transformer 76. The manner in which the output voltage, and thus the voltage across the secondary winding 80, decreases is illustrated by a curve 86, as shown in Fig. 2. By so connecting the saturating reactor 84 between the input of the transformer 76 and the output of the sensing circuit 34, the critical setting of the control relay 50 is lessened. In order to rectify the output of the saturating transformer 76 and apply direct current to the operating coil 54, of the control relay 50, a full-wave dry-type rectifier 90 is interconnected between the secondary winding 80, of the transformer 76, and the operating coil 54.

As hereinbefore mentioned, the control relay 40 under given conditions effects an energizing circuit to the control means 38, which in this instance is a relay comprising an operating coil 92 and an armature 94 which is mechanically connected to the valve 26 to effect an operation thereof. On the other hand, the control relay 40 comprises an operating coil 96, an armature 98, a movable contact 100, and stationary contacts 102. As was the case with the control relay 50, the control relay 40 receives energy from a saturating transformer, namely transformer 104 having a primary winding 106 and a secondary winding 108. Thus, the size of the control relay 40 is likewise minimized by providing the saturating transformer 104 and interconnecting it between the output of the sensing circuit 34 and the control relay 40.

As illustrated, the primary winding 106 of the transformer 104 is connected in series circuit relationship with an adjustable current-limiting resistor 110 which functions to limit the current flow through the primary winding 106 when the saturating transformer 104 is saturated. By adjusting the current-limiting resistor 110, the value of percent load on the generator 12 at which the saturating transformer 104 saturates can be varied. In practice, the transformer 104 should saturate at a lower value of percent load on the generator 12 than should the transformer 76. For purposes of illustration, it will be assumed that the resistor 110 is so adjusted that the saturating transformer 104 saturates at aproximately 10 percent load current in the generator 12. The manner in which the output voltage of the saturating transformer 104 varies with changes in the magnitude of its input voltage is illustrated by a curve of 112, as shown in Fig. 2. For the purpose of obtaining direct current for the operating coil 96 of the control relay 40, a full-wave dry-type rectifier 114 is interconnected between the operating coil 96 and the secondary winding 108 of the saturating transformer 104.

In order to establish an energizing circuit to the operating coil 92 of the relay 38 in response to a dropping out of the control relay 40, a relay 116 is provided. In this instance, the relay 116 comprises an operating coil 118, a movable contact 120, and associated stationary contacts 122, and a movable contact 124 and associated stationary contacts 126. In operation, the time delay relay 42 is responsive to the operation of the relay 116 and effects a by-pass circuit around the contacts 66 and 68 of the time delay relay 60 for a predetermined length of time provided both the control relays 40 and 50 are dropped out and the relay 116 has been picked up. This insures an operation of the valve 26 under such conditions. The time delay relay 42 comprises an operating coil 128, an armature 130, a movable contact 132 and associated stationary contacts 134, a movable contact 136 and associated stationary contact 138, an actuating member 140, the function of which will be explained hereinafter, a compression spring 142 for maintaining the movable contact 136 in electrical engagement with its associated stationary contacts 138 until the actuating member 140 effects a disengagement of the movable contact 136 from the stationary contacts 138, and a time delay mechanism 144, which in this instance is a dashpot which is diagrammatically illustrated. In practice, the relays 38, 42, 60, and 116 receive their energy from conductors 146 and 146' which have applied thereto a direct-current voltage.

The operation of the apparatus illustrated in Fig. 1 will now be described. When the generator 12 is operating under full load, all the relays are positioned as shown in Fig. 1. Assuming the load on the generator 12 decreases to just below 50 percent of its value, then the voltage across the primary winding 78 of the transformer 76 is not of sufficient value to saturate the transformer 76, and thus the control relay 50 drops out. When the control relay 50 drops out, its movable contact 56 engages the associated stationary contacts 58 thereby to complete the energizing circuit to the operating coil 64 of the time delay relay 60. This energizing circuit extends from the conductor 146' through the operating coil 64, and the movable contact 56 of the control relay 50, to the conductor 146. Thus, on completion of this energizing circuit, the timing operation of the time delay relay 60 is initiated.

When the timing operation of the time delay relay 60 is initiated, the movable contact 68 of the relay 60 remains in engagement with its associated stationary contacts 66 for a preset time until the actuating member 70 effects an upward movement of the movable contact 68, thereby to disengage the contacts 68 and 66.

If the load on the generator 12 decreases to a value below 10 percent of the load on the generator 12, the control relay 40 drops out, thereby to complete an energizing circuit to the operating coil 118 of the relay 116, provided the timing operation of the relay 60 is not complete. This energizing circuit to the operating coil 118 extends from the conductor 146' through the movable contact 68 of the time delay relay 60, the operating coil 118 of the relay 116, the movable contact 100 of the control relay 40, and the movable contact 56 of the control relay 50, to the conductor 146. However, it is to be understood that this energizing circuit to the operating coil 118 of the relay 116 is only completed if the load on the generator 12 decreases sufficiently rapidly from the 50 percent value to below the 10 percent value of load on the generator 12, so as to be within the timing operation of the relay 60. Of course, if the timing operation of the time delay relay 60 has been completed before the control relay 40 is dropped out, it is impossible for the control relay 40 to effect an energizing circuit to the operating coil 118 of the relay 116. This essentially is the rate determining function.

Assuming the load on the generator 12 decreases to below 10 percent during the timing operation of the relay 60, the movable contacts 120 and 124 are actuated into electrical engagement with their associated stationary contacts 122 and 126, respectively. With the movable contacts 120 and 124 in engagement with their associated stationary contacts 122 and 126, respectively, an energizing circuit is completed to the operating coil 92 by the relay 38, which extends from the conductor 146', through the movable contact 120 of the relay 116, the operating coil 92 of the relay 38, and the movable contact 124 of the relay 116, to the conductor 146. When the operating coil 92 of the relay 38 is energized, a movement of the valve 26 is effected, thereby to decrease the amount of steam applied to the turbine 24, thus to check the speed of both the turbine 24 and the generator 12, to thereby prevent overspeeding of the generator 12.

The picking up of the relay 116 also completes an energizing circuit to the operating coil 128 of the time delay relay 42, thereby to initiate a timing operation of the relay 42 thus to insure that once the operating coil 92 of the relay 38 is energized, an energizing circuit will remain to the operating coil 118 of the relay 116 for a preset time and thus to the operating coil 92 of the control relay 38, provided the control relays 40 and 50 remain in the dropped out position. In other words, as hereinbefore mentioned, under such conditions the time delay relay 42 effects a by-pass circuit around the contacts 136 and 138 of the time delay relay 60. Of course, if the time delay relay 42 were not provided, the energizing circuit to the operating coil 92 of the relay 38 would be interrupted as soon as the timing operation of the time delay relay 60 was completed.

It is to be noted that when the load on the generator 12 is restored to full value, the protective device 10 automatically resets itself. For instance, when the control relay 40 is picked up, the relay 116 drops out to the position shown in Fig. 1. On the other hand, when the control relay 50 is picked up, the time delay relay 60 drops out to the position shown in Fig. 1, and when the time delay relay 42 has completed its timing operation, it returns to the position shown in Fig. 1.

It is to be understood that appropriate sensing means that would actually measure three-phase power could be substituted for the sensing circuit 34.

The apparatus embodying the teaching of this invention has several advantages. For instance, the apparatus is such that it can be readily adapted to operate in conjunction with a diversity of generators. In addition, the apparatus is sensitive only to load levels and time and, therefore, is not adversely affected by distorted wave shapes of fault currents or of wave shapes during breaker operation.

Since certain changes may be made in the above described apparatus and circuits and different embodiments of the invention can be made without departing from the spirit and scope thereof, it is intended that all matter contained in the above description or shown in the accompanying drawing shall be interpreted as illustrative and not in a limiting sense.

We claim as our invention:

1. In control apparatus for preventing an overspeed condition of a generator driven by a prime mover, the combination comprising, sensing means for obtaining at its output a measure of the load on the generator, timing means, circuit means connecting said timing means to said sensing means, switch means responsive to the output of the sensing means for initiating a timing operation of the timing means when the load on the generator decreases to a predetermined value, control means for changing the speed of the prime mover and thus the speed of the generator in response to said timing means, and other switch means also responsive to the output of the sensing means for energizing circuit means between said sensing means and said control means when the load on the generator decreases further to a lower predetermined value within the timing operation of the timing means, to thereby decrease the speed of the generator and thus prevent its overspeeding.

2. In control apparatus for preventing an overspeed condition of a generator driven by a prime mover, the combination comprising, sensing means for obtaining at its output a measure of the load on the generator, a time delay relay, a control relay responsive to the output of the sensing means for providing an energizing circuit to the time delay relay when the load on the generator decreases to a predetermined value to thereby initiate a timing operation of the time delay relay, control means for changing the speed of the prime mover and thus the speed of the generator, and means comprising another control relay responsive to the output of the sensing means for providing a circuit between said control means and said sensing means when the load on the generator decreases further to a lower predetermined value within the timing operation of the time delay relay to thereby decrease the speed of the generator and thus prevent its overspeeding.

3. In control apparatus for preventing an overspeed condition of a generator driven by a prime mover, the combination comprising, sensing means for obtaining at its output a measure of the load on the generator, timing means, switch means responsive to the output of the sensing means for initiating a timing operation of the timing means when the load on the generator decreases to a predetermined value, control means for changing the speed of the prime mover and thus the speed of the generator, a saturating transformer having an input and an output, the input of the saturating transformer being responsive to the output of the sensing circuit, and circuit means comprising a control relay connecting the output of the saturating transformer to said control means when the load on the generator decreases further to a lower predetermined value within the timing operation of the timing means, to thereby decrease the speed of the generator and thus prevent its overspeeding.

4. In control apparatus for preventing an overspeed condition of a generator driven by a prime mover, the combination comprising, sensing means for obtaining at its output a measure of the load on the generator, a time delay relay, a saturating transformer having an input and an output, the input of the saturating transformer being responsive to the output of the sensing means, a control relay responsive to the output of the saturating transformer for initiating a timing operation of the time delay relay when the load on the generator decreases to a predetermined value, control means for changing the speed of the prime mover and thus the speed of the generator, another saturating transformer having an input and an output, the input of said another saturating transformer being responsive to the output of the sensing circuit, and another control relay responsive to the output of the said another saturating transformer, circuit means connecting said another control relay to said control means when the load on the generator decreases further to a lower predetermined value within the timing operation of the time delay relay, to thereby decrease the speed of the generator and thus prevent its overspeeding.

5. In control apparatus for preventing an overspeed condition of a generator driven by a prime mover, the combination comprising, sensing means for obtaining at its output a measure of the load on the generator, a time delay relay, a saturating reactor, a saturating transformer having an input and an output, the saturating reactor being connected between the input of the saturating transformer and the output of the sensing means to effect a rapid decrease in the output of the saturating transformer when its input voltage decreases to a predetermined value, a control relay responsive to the output of the saturating transformer for initiating a timing operation of the time delay relay when the load on the generator decreases to a predetermined value, control means responsive to the time delay relay for changing the speed of the prime mover and thus the speed of the generator, another saturating transformer having an input and an output, the input of said another saturating transformer being responsive to the output of the sensing circuit, and another control relay responsive to the output of the said another saturating transformer, circuit means connecting said another control relay to said control means when the load on the generator decreases further to a lower predetermined value within the timing operation of the time delay relay, to thereby decrease the speed of the generator and thus prevent its overspeeding.

6. Control apparatus for preventing an overspeed condition of a generator driven by a prime mover, the combination comprising, sensing means for obtaining at its output a measure of the load on the generator, a first time delay relay, a saturating reactor, a saturating transformer having an input and an output, the saturating reactor being connected between the input of the saturating transformer and the output of the sensing means to effect a rapid decrease in the output of the saturating transformer when its input voltage decreases to a predetermined value, a control relay responsive to the output of the saturating transformer for initiating a timing operation of said first time delay relay when the load on the generator decreases to a predetermined value, control means for changing the speed of the prime mover and thus the speed of the generator in response to said first time delay relay, another saturating transformer having an input and an output, the input of said another saturating transformer being responsive to the output of the sensing circuit, a second time delay relay, another control relay responsive to the output of the said another saturating transformer, circuit means connecting said second time delay relay to said control means when the load on the generator decreases further to a lower predetermined value within the timing operation of the said first time delay relay, and for initiating a timing operation of said second time delay relay, whereby the said second time delay relay effects a by-pass circuit around the said first time delay relay when the energizing circuit to the said control means is completed, to thereby insure an operation of the said control means to decrease the speed of the generator and thus prevent its overspeeding.

References Cited in the file of this patent

UNITED STATES PATENTS

| | | |
|---|---|---|
| 1,497,412 | Staege | June 10, 1924 |
| 2,000,753 | Griscom | May 7, 1935 |
| 2,243,225 | Schwender | May 27, 1941 |